Nov. 6, 1956  G. A. MORGAVI, JR  2,769,445
OIL MIST LUBRICATOR FOR SUCTION DEVICES
Filed Dec. 14, 1953
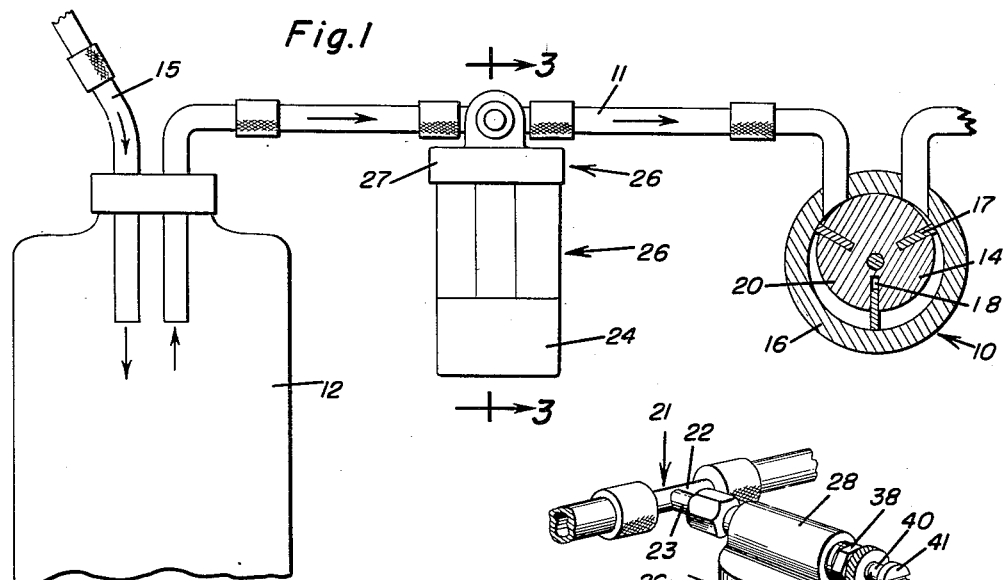
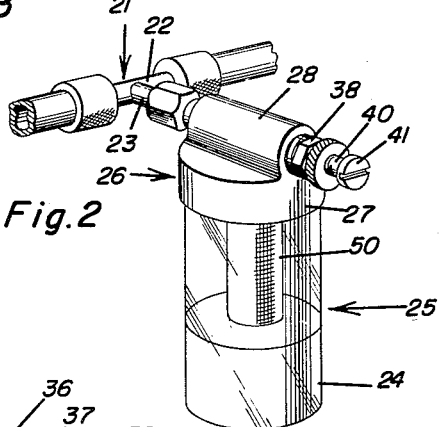
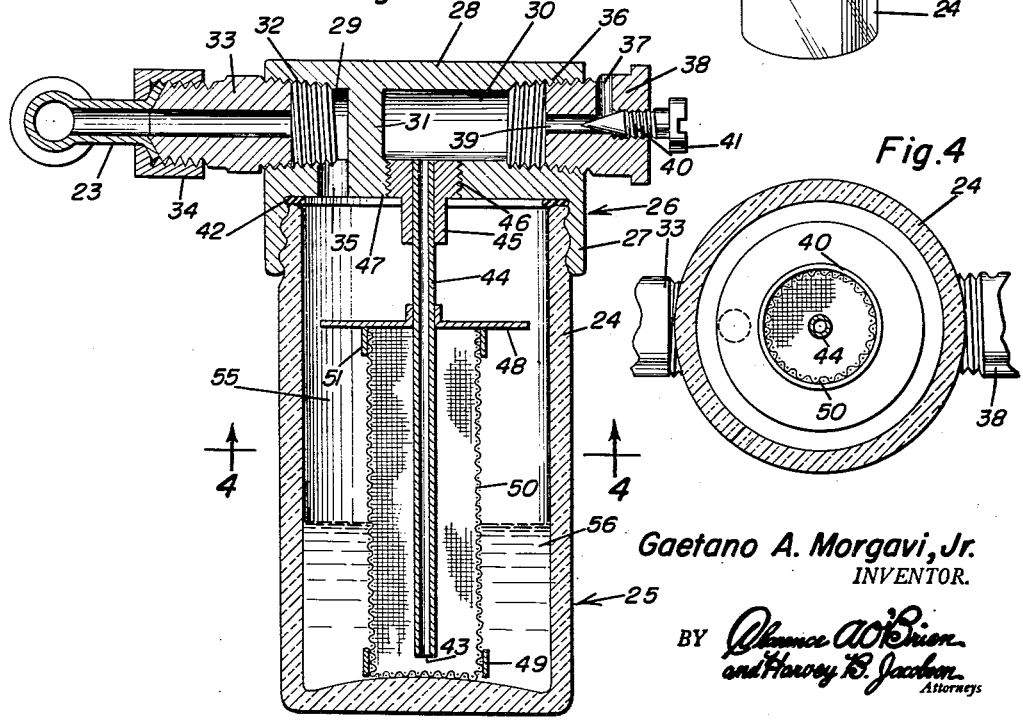
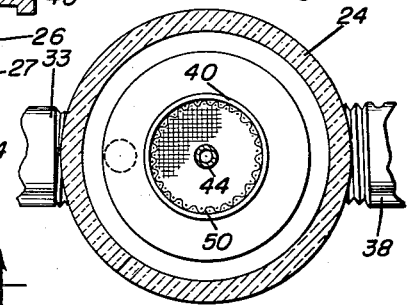
Gaetano A. Morgavi, Jr.
INVENTOR.

United States Patent Office 2,769,445
Patented Nov. 6, 1956

2,769,445

OIL MIST LUBRICATOR FOR SUCTION DEVICES

Gaetano A. Morgavi, Jr., New Orleans, La., assignor of one-half to Edward J. Hamback, New Orleans, La.

Application December 14, 1953, Serial No. 398,033

6 Claims. (Cl. 128—278)

This invention relates to lubricating apparatus and more specifically to lubricating devices operating in conjunction with suction devices, the invention being more particularly adapted for cooperation with a surgical, diagnostic and therapeutic evacuation unit, such as used for the removal of body fluids, mucous substances or the like during surgical operations, during treatments, for diagnostic purposes, or the like.

With surgical, diagnostic and similar apparatus removing body fluids or semi-fluid matter by suction, the suction pressure is most frequently produced by a compressor with metal plates rotating at high speed which is driven by an electric motor, said compressor being connected with the suction line containing a suction bottle or other suitable container which receives the extracted fluid, mucus, etc. On account of the high speed at which the compressor revolves it is necessary to lubricate it constantly, but on account of the small space allowed and the simplicity of the design necessary to produce an unfailing apparatus manipulated essentially by mechanically unskilled persons, the lubrication is always performed by hand by filling oilers provided near the rotating members of the unit. One filling of the oil vessels associated with the device usually supplies oil for an uninterrupted operation of several hours, usually three to five hours.

Quite a number of devices of this type, however, operate continuously for more than three to five hours and as the operation of refilling the oilers is an irregular one depending on the duration of the operation and on the load, it may be and it actually is sometimes overlooked, especially as the interest of those operating the apparatus is practically completely absorbed by the events connected with the treatment or the surgery. The consequences of such an oversight may however be very serious.

It is therefore an object of the invention to provide an automatic lubricating device for the compressor and other rotating units which supplies most effectively and economically lubrication in the form of a thin film which is deposited on the moving surfaces, said supply being self regulating insofar as the supply of the lubricating material increases automatically with the increase of the load.

It is a further object of the invention to provide an oil mist lubrication system covering the parts to be lubricated with a continuous thin film of finely distributed lubricating particles, said oil mist lubrication system being adapted for cooperation with the suction system and utilizing said suction system to such an extent that merely the addition of a small vessel or container is necessary to produce a completely automatic self regulating lubricating system.

It is a further object of the invention to provide an oil atomizing and distributing unit which is equipped with means for a fine distribution of the oil, so that transportation of the lubricant may be effected by means of the air particles of smallest size carrying the lubricant while moving under suction.

Further objects of the invention are more specific and will be explained in connection with the detailed specification.

The invention will be more specifically described with reference to the accompanying drawing showing one embodiment thereof. It is however to be understood that the embodiment which has been illustrated in the drawing relates to a specific example selected in order to explain the principle of the invention and the best mode of applying this principle. The illustration of a specific example is not to be interpreted as limitative and the invention is therefore not necessarily tied to constructional features shown in the embodiment which is illustrated.

In the drawing:

Figure 1 is an elevational, partly sectional diagrammatic view of the suction producing compressor, the suction vessel and the suction line connecting the same and showing the location of the lubricating device according to the invention.

Figure 2 is a perspective view of the lubricating device according to the invention illustrating its connection with the suction line.

Figure 3 is an elevational sectional view through the device, the section being taken through the median plane of symmetry and being indicated by line 3—3 in Figure 1.

Figure 4 is a sectional plan view of the device illustrated in Figure 3, the section being taken along line 4—4 of Figure 3.

The invention will be best understood by briefly referring to the general construction of the apparatus to be lubricated. In an apparatus such as used in connection with surgical operations or surgical treatments etc., body fluids and other viscous and semi-fluid matter has to be removed usually by suction and in diagnostic apparatus or apparatus for combined treatment there is usually a suction and a pressure side, the invention being applied however only to the former. The suction apparatus always essentially comprises a rotary pump or compressor 10, a suction line 11, a vacuum bottle 12 and a suction cup (not illustrated) to be applied to the field of operation (for instance to the throat during tonsillectomy) and which is mounted on or connected with the end of the suction tube or hose 15.

The pump or compressor 10 is usually not of the ordinary type but comprises a steel chamber 16 cooperating with bronze slides 17 which reciprocate within slots 18 of a rotating drum 14, the slides being kept pressed against the wall of the chamber by suitable means. Such a pump produces sufficient vacuum for evacuating even relatively large quantities of body fluids and of other matter on its vacuum side. However, it will be clear that such a pump constructed with slides scraping the interior of a drum shaped casing needs excellent lubrication and this need is intensified by the fact, explained below, that particles may come in which may cause severe disturbances if lubrication fails or is poor.

The vacuum produced by the pump 10 is transmitted to the suction line 11 and to the vacuum bottle 12 which in its turn transmits suction to the cup or cups. Any fluid or other viscous or semi-fluid matter evacuated through the suction tube 15 connected with the suction cup is of course retained in the vacuum bottle 12 which must be inspected from time to time to avoid accumulation of matter within said bottle to such an extent that it exceeds certain heights or levels.

Filters and other protective appliances are arranged between the bottle and the pump, but, as above stated, it is practically inevitable that particles are carried by the air stream into the pump casing where they may agglomerate. This accentuates the need for ample and constant lubrication to counteract any detrimental influence of such small agglomerations which may adhere to the walls of the pump casing.

According to the invention, therefore, an automatic lubricating device is connected with the vacuum line 11 leading from the vacuum bottle 12 in which the evacuated matter accumulates to the compressor or pump 10, said connection being made by means of a T-junction piece 21 the straight or through connection 22 of which is inserted into the suction line 11 while the transverse or branch piece 23 is connected with the lubricating device 25 according to the invention. It is thus seen that the lubricating device 25 is connected in parellel to the vacuum bottle 12. The lubricating device 25 consists essentially of a glass or transparent plastic container 24 provided with screw threads on the top, which screw threads serve to retain a cap member 26. The cap member 26 is provided with a sleeve 27 having internal threads engaging those at the top of the container so that it may be tightly screwed on top of the container sealing the same by means of the sealing ring 42. The cap is provided, in addition, with a tubular upper portion 28 surrounding two cylindrical chambers 29, 30, separated by a partition wall 31. The outer end of each tubular chamber 29, 30, respectively, is internally threaded. The internal threads 32 at the end of chamber 27 receive external threads of a channeled junction piece 33 which is threaded on its outer end and which forms the connection with the branch tube 23 of the T-junction piece 21, the latter connection being made by means of a Farrell nut 34. This chamber 29 is moreover in communication with the interior of the container 24 by means of an opening 35 in the cap.

The second chamber 30, at the end of which internal threads 36 are provided, is closed by a threaded stopper 38 engaging the internal threads, which stopper is provided with a central bore 39 and a further side bore 37 at right angles thereto and leading to the outside. The central bore 39 is threaded at its end which threads engage those of a needle valve 40 adapted to project into the bore 39 and adapted to close to a varying extent the side bore 37 and the communication of the chamber 30 with the outer air through the said bores 39 and 37. The needle valve may be provided with a suitable head 41 which is slotted so as to permit adjustment of the needle valve 40 by advancing it or withdrawing it to a varying extent.

The chamber 30 communicates with the interior of the container 34 by means of a tube 44 of relatively small diameter which tube is carried by a stopper 45 having a threaded portion 47 which is screwed into a threaded opening 46 at the bottom of the chamber 30 which connects the latter with the container, the communication being however restricted to the tube 44 by the above described arrangement.

The tube 44 reaches down into the container towards the bottom of the same and its orifice 43 is therefore located only a short distance from the bottom of the container 24. The tube is partly surrounded by a cylindrical screen 50 consisting of wire mesh with very fine mesh size, topped by a brass disk 48 which fills a substantial part of the cross section of the container and leaves only a comparatively small annular space through which the air may freely circulate. The brass disk 48 may be seated directly on a ring support 51 by means of which the top of the wire mesh screen is reinforced. A similar reinforcing ring 49 may be arranged at the bottom of the screen 50.

The device, before being connected with the suction line must be filled with oil 56 up to a certain level which can be observed through the transparent wall of the container 24. The oil level must be below the brass disk 48. When connected with the suction line 11 through the transverse or branch piece 23 of the T-junction piece 21 by means of channelled junction member 33 and opening 35, air is sucked in from the outside through the side bore 37, the central channel or bore 39 of stopper 38, the chamber 30 and the tube 44. The air bubbles through the oil and these air bubbles entrain some oil and become coated with it and therefore above the oil level an oil mist is formed which is sucked into the suction line through opening 35, enters the compressor or pump and covers the wall of the compressor or pump and with a very thin oil film of microscopic dimensions which is called a microfilm.

Obviously, the quantity of oil carried by the air increases with the load of the compressor which thus receives more lubricant when under a heavier load. For adjustment to the average load the quantity of air coming in under suction into the container 24 filled with oil may be regulated by the needle valve 40. However, when the pump is under a varying and heavy load and temporarily works at full capacity there is some danger that the air bubbles which are formed will be too large and that the quantity of oil which is contained in the mist above the oil level becomes too small. For this purpose the wire mesh screen 50 and the brass disk 48 are arranged which serve, in the first place, to break up air bubbles which are too large. This is partly done by the wire mesh which is sufficiently fine to permit solely the passage of very small air bubbles and this is further, also, produced by the disk 48 against which larger air bubbles will be thrown and break up into small bubbles so that only the latter will pass above the annular space left between the container 24 and the brass disk 48 and reach the space above said disk 48, forming a fine oil mist carried by very small air bubbles.

It will thus be seen that the arrangement always produces an ample quantity of oil mist suitable for lubrication regardless of the load on the pump and that lubrication moreover increases with the increase of the load.

It will thus be seen that an automatic lubrication is provided, specifically adapted for cooperation with surgical, therapeutical, diagnostic and similar apparatus in which a suction is produced by means of a rotary pump which apparatus is operable by the suction thus produced and which is self regulating and automatic and provides an oil mist lubrication constantly and uninterruptedly in conformity with the requirements of the apparatus served, said oil mist lubrication depositing on those parts of the apparatus which are subjected to friction an extremely thin film of oil which is constantly renewed as it is intimately associated with the air or gas drawn into the apparatus.

It will also be seen that the above described system has many advantages connected with its self regulation, its automaticity which eliminates the constant attendance and its self contained arrangement, but it also has further advantages connected with the fine oil distribution, the manual regulability of the average air supply for an individual apparatus and the possibility to work the apparatus either at small or at full capacity without in any way impairing the oil film formation.

It will be clear that changes in the constructive features and especially in the unessential features of the invention may be made without in any way departing from the essence of the invention as defined in the annexed claims.

What is claimed as new is as follows:

1. An automatic lubrication system comprising a suction line, a compressor connected with its suction side to the said suction line, a surgical apparatus for evacuating substances from the human body connected with the said suction line, a lubricant container filled with a lubricant, having a top portion divided into two separate compartments, one of said compartments being connected with the atmosphere by means of a restricted connection and being further connected with the bottom of the container, the other compartment being connected with the top of the container, on one side and with the suction line on the other side, air being sucked into the suction line to the last named compartment connected with the top of the container and through the first named compartment having a restricted connection with the atmosphere through its connection with the bottom of the container, the air entering through the lubricant filling the container containing particles of the lubricant and forming a mist while drawn into the suction line.

2. An automatic lubrication system comprising a suction line, a compressor, the suction side of which is connected with said suction line, a surgical apparatus for evacuating substances from the human body, connected with the said suction line, a lubricant container partly filled with a liquid lubricant having a top portion, a cap seated on said top portion provided with two separate chambers, one of said chambers communicating with said top portion of the container on one side, and with the suction line on the other side and the other chamber communicating with the bottom portion of said container and with the atmosphere, means for providing a restricted connection between said last named chamber and the atmosphere including an adjustable needle valve, regulating said restricted connection, the air entering through the restricted connection regulated by the needle valve being drawn through the liquid lubricant into the space in the top portion of the container and entraining during its passage particles of the lubricant forming a mist above the level of the liquid lubricant which is drawn into the suction line.

3. An automatic lubrication system comprising a suction line, a compressor, the suction side of which is connected with the said suction line, a surgical apparatus for evacuating substances from the human body connected with the said suction line, a suction bottle for depositing the substances removed from the surgical apparatus inserted into the suction line between the said surgical apparatus and the compressor, a container filled with a lubricant, communicating with two separate chambers, one of said chambers being connected with the suction line on one side and with the top portion of the container on the other side, and the other chamber communicating with the open air on one side and the bottom of the lubricant container on the other side, the connection between the bottom of the container and the last named chamber being formed by a tube reaching from said chamber to a point near the bottom of the container the connection of the lubricant container with the suction line being made between the compressor to be lubricated and the suction bottle, the suction effect exercised by the suction line drawing air bubbles through the lubricant entering near the bottom of the container and carrying with them small particles of the lubricant while rising which form a mist suspended in air, which mist enters the suction line and provides the lubricating film for the rotating parts.

4. An automatic lubricator as claimed in claim 3, wherein the lubricant container is provided on its top portion with a cap, having two separate tubular cavities each forming one of the chambers communicating with the lubricant container, the aforesaid chamber communicating with the bottom portion of the container, by means of a tube reaching from said chamber to the bottom of the container being provided with a bore forming part of a communication with the open air, and a needle valve within said bore for regulating the volume of the air entering into said bore.

5. An automatic lubricator as claimed in claim 4, wherein the tube leading to the bottom portion of the container is surrounded with a fine wire mesh screen, through which the air escaping from the tube must pass on its way to the top portion of the container.

6. An automatic lubricator as claimed in claim 4, wherein the container is provided with a circular disk filling a major portion of the cross section of the container and leaving a restricted annular space for the passage of air from the bottom portion to the top portion, said disk breaking up the oversized air bubbles entering through the tube into the bottom of the container.

References Cited in the file of this patent

UNITED STATES PATENTS

| | | |
|---|---|---|
| 656,409 | Laraway et al. | Aug. 21, 1900 |
| 1,889,137 | White | Nov. 29, 1932 |
| 1,896,421 | Quivey | Feb. 7, 1933 |
| 1,983,066 | Black | Dec. 4, 1934 |
| 2,272,926 | Squiller | Feb. 10, 1942 |
| 2,280,992 | Wright et al. | Apr. 28, 1942 |
| 2,367,721 | Gothberg et al. | Jan. 23, 1945 |
| 2,459,398 | Walters | Jan. 18, 1949 |